United States Patent [19]
Eberlein et al.

[11] 4,193,706
[45] Mar. 18, 1980

[54] BOLT CONNECTIONS BETWEEN TUBULAR RODS AND JUNCTIONS IN THREE-DIMENSIONAL FRAMEWORKS

[75] Inventors: Helmut Eberlein, Wurzburg; Hermann Quenzel, Lengfeld; Otto Kornberger, Hettstadt, all of Fed. Rep. of Germany

[73] Assignee: Mero-Raumstruktur GmbH & Co. Wurzburg, Fed. Rep. of Germany

[21] Appl. No.: 932,611

[22] Filed: Aug. 10, 1978

[30] Foreign Application Priority Data

Aug. 13, 1977 [DE] Fed. Rep. of Germany ....... 2736635

[51] Int. Cl.$^2$ .............................................. B25G 3/00
[52] U.S. Cl. .................................... 403/19; 403/264; 52/81

[58] Field of Search ............... 403/264, 217, 218, 260, 403/234, 233, 237, 170, 171, 172, 176, 178, 44, 19, 22; 52/81

[56] References Cited

U.S. PATENT DOCUMENTS

| | | | |
|---|---|---|---|
| 3,982,841 | 9/1976 | Endzweig | 403/171 X |
| 3,995,962 | 12/1976 | Mylaeus | 403/171 X |

*Primary Examiner*—Wayne L. Shedd
*Attorney, Agent, or Firm*—Jacobi, Lilling & Siegel

[57] ABSTRACT

A bolt connection between tubular rods and junctions in three-dimensional frameworks wherein the tubular rods are of constant diameter along their entire length and it continues the same beyond the hook-up parts at the tubular rod ends as far as those ends of the hook-up parts which are assembled each with one drive sleeve, and the smallest outside diameter of the drive sleeves being equal to or exceeding that of the tubular rods and of the hook-up parts.

5 Claims, 3 Drawing Figures

BOLT CONNECTIONS BETWEEN TUBULAR RODS AND JUNCTIONS IN THREE-DIMENSIONAL FRAMEWORKS

BACKGROUND OF THE INVENTION

The invention relates to bolt connections between tubular rods and nodes or junctions in three-dimensional frameworks, with one threaded bolt rotatably and within limits axially displaceably seated at the ends of each tubular rod and with an associated drive sleeve non-rotatably fixed to the threaded bolt but within limits axially displaceably mounted to it, the threaded bolt being rotatably insertable into one of the threaded bores of a junction and the drive sleeve being lockable between a beveling at the junction and the end face of hook-up parts at the ends of the tubular rods.

Such a bolt connection is known, for instance, from German Pat. No. 901,955. In order to have the latitude of using on one hand relatively small junctions and on the other to connect numerous tubular rods to them, the hook-up parts to the tubular rods in the known design have been shaped as tapered parts of frusta of cones or pyramids, the front face resting surface of the drive sleeves being of correspondingly small diameters. Because of the tapered ends of the tubular rods and the drive sleeves adapted with their diameters to them, such a bolt connection is capable of withstanding only fairly low bending forces, whereby such connections are unsuitable for instance for single-shell three-dimensional frameworks or single-shell domes, as in addition to the ordinary tension and compression forces there are substantial bending and torsional moments, which must be absorbed by the bolt connections between the tubular rods and the junctions.

The above drawbacks also occur in the screw connection between tubular rods and couplings disclosed by German Pat. No. 912,145, which, while using drive sleeves of relatively large-diameter resting surfaces, nevertheless makes use of tubular rod ends which taper off conically, as already explained above. Even the reinforcing sleeves mounted over the ends of the tubular rods fall short of thereby enhancing the resistance to bending of this known screw connection in such manner as to be suitable for single-shell three-dimensional frameworks. Additionally, these reinforcing sleeves require additional space and practically prohibit using sideways applied power-driven screwdriver devices which are required to tighten highly rigid, bending-resistant screw connections for instance for three-dimensional framework domes.

It is further known as regards three-dimensional frameworks from German Offenlegungschrift No. 2,246,478 how to hook up the tubular rods with full outside diameter, that is without any taper, to spherical junctions. This known design, however, is such that every threaded bolt is welded by its head into the end of a tubular rod, the threaded bolt at the other end of the tubular rod being pressed outwardly for instance by a compression spring and requiring tightening by means of a screwdriver. Such a screw connection, however, is entirely inadequate for single-shell three-dimensional frameworks. Since the end faces of the tubular rods are beveled inwardly, whereby they are seated in a shape-locking manner on the spherical surface of the junction, the bending forces at the rod ends are transmitted to the junction solely by the threaded bolt, the tubular rods being kept on the junctions' surfaces in the manner of a universal joint by means of the threaded bolts.

SUMMARY OF THE INVENTION

The present invention addresses the task of creating a highly solid bolt connection between the tubular rods and the junctions in three-dimensional frameworks, which in addition to tension and compression forces also can absorb extremely high bending and torsional forces, such as occur for instance in single-shell, large, three-dimensional frameworks. The bolt connection, furthermore, is such that it can be tightened or loosened using power screwdrivers.

The present invention solves this problem for a bolt connection of the initially cited kind in that the tubular rods are of constant diameter along their entire length and in that it continues the same beyond the hook-up parts at the tubular rod ends as far as those ends of the hook-up parts which are assembled each with one drive sleeve, and in that the smallest outside diameter of the drive sleeves is equal to or exceeds that of the tubular rods and of their hook-up parts. When such a bolt connection is tightened, the particular tubular rod end together with the hook-up part and the drive sleeve practically form an element of the same or essentially the same outside diameter, even though it is enlarged toward the junction, whereby even extremely large bending moments may be satisfactorily passed on to the junction. Because the smallest outside diameter of a drive sleeve equals or exceeds that of the tubular rods or of their hook-up parts, a power screwdriver may easily be applied to the drive sleeve from the side to transmit the torque required to establish a highly solid connection to the threaded bolt. The finished connection, furthermore, can transmit appreciable torsional forces from a tubular rod to a junction, and vice versa, in addition to the ordinary tension and compression forces.

According to another embodiment of the invention, the drive sleeve is provided with a hub segment mounted on the threaded bolt which is connected by several spokes to a felly-like section supporting the work surfaces for a screwdriver, whereby economy in weight is obtained for the drive sleeve and further assembly is facilitated.

Simplification of construction with corresponding reduction in assembly costs is obtained by a further characteristic of the invention in that the hub segment is so set back at both ends with respect to the felly section that the end faces of said section form the support surfaces of the drive sleeve, the support surfaces being of circular design.

According to another embodiment of the invention, the support surfaces for the drive sleeves in the form of bevels at the junctions also are of circular design to correspond to the drive sleeves associated resting surfaces, whereby the cost in labor relating to the junctions is further reduced and the economy of the screw connection is accordingly increased.

BRIEF DESCRIPTION OF THE DRAWING

The invention is explained further below in relation to the drawing of a preferred embodiment wherein.

DESCRIPTION OF THE PREFERRED EMBODIMENT

Figure 3:
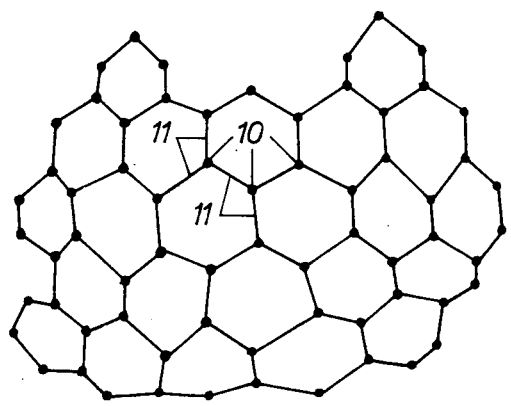
FIG. 3 is a schematic cutout of a single-shell, three-dimensional framework dome, where the screw connection of the invention is applicable.

A portion of a three-dimensional framework dome is shown in FIG. 3 wherein three tubular rods 11 are connected at different angles to each junction 10 and the individual screw or bolt connections must absorb tension, compression, bending and torsional forces between the tubular rods and the junctions.

Figure 1:
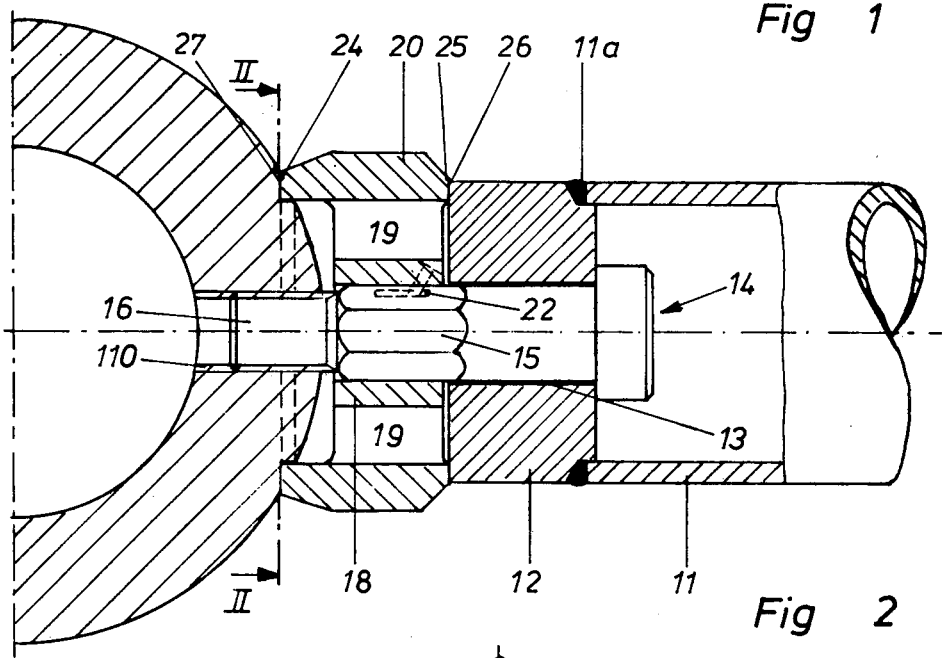
FIG. 1 is a side elevational view in section of the connection of the invention showing on a much reduced scale part of a tubular rod and a junction.

FIG. 1 shows part of a hollow junction 10 comprising a radial threaded bore 110 which, per FIG. 3, also is provided with two further such threaded bores (not shown in FIG. 1). FIG. 1 furthermore shows one end of a tubular rod 11 which is of circular cross-section to which a cylindrical hook-up part 12 is welded by means of an annular weld 11a, the outer diameter of the hook-up part 12 corresponding substantially to that of tubular rod 11. Hook-up part 12 is provided with a central lengthwise bore 13 through which extends in rotatable and axially displaceable manner a threaded bolt 14 with a hexagonal head 15. The threaded bolt 14 next to its hexagonal head 15 comprises a threaded segment 16 which is screwed into the threaded bore 110 in junction 10 by means of drive sleeve 17.

Figure 2:
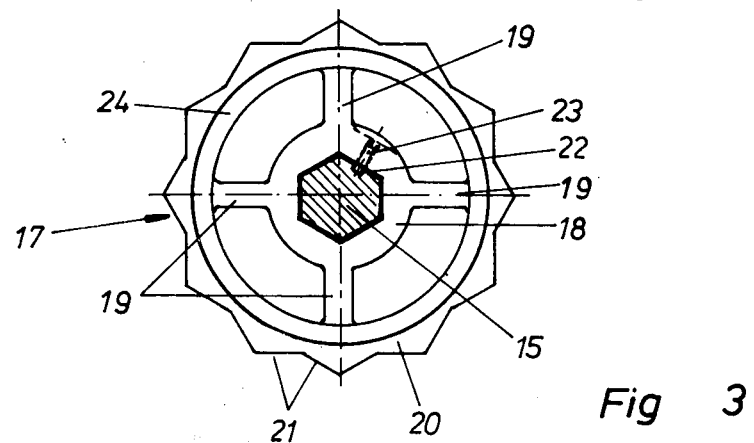
FIG. 2 is an end view of a drive sleeve along the direction of line II—II of FIG. 1, the threaded bolt being shown in section in the region of its hexagonal head.

The drive sleeve 17, in the embodiment shown in FIG. 2, comprises a hub segment 18 connected by four spokes 19 to a felly section 20. Engaging surfaces 21 for a preferably hydraulically or pneumatically powered screwdriver are provided at the outer periphery of the section 20.

The inside cross-section of hub segment 18 is closely fitted to the periphery of the hexagonal head 15 to achieve a connection secure against rotation between threaded bolt 14 and drive sleeve 17 while nevertheless permitting an axial relative displacement between them.

In order to reliably secure drive sleeve 17 to the threaded bolt 14 and hence to tubular rod 11, a longitudinal groove 22 substantially parallel to the axis of the threaded bolt is provided at the hexagonal head 15, groove 22 being penetrated by the inside end of a set screw 23 which is screwed into the hub segment 18, as shown in FIG. 2. The length of the groove 22 is so selected that it permits the required longitudinal motion of threaded bolt 14 toward the junction 10 when tightening the bolt connection.

FIG. 1 shows that the hub segment 18 inclusive of the spokes 19 is axially set back with respect to the felly-like section 20. Accordingly, the annular end faces of sector 20 form the resting surfaces 24 and 25 of the drive sleeve, their outer diameters being the same with respect to one another but slightly larger than of hook-up parts 12 and of tubular rod 11. The abutting surface 25 cooperates with the end face 26, made perpendicular to the axis of the tubular rod, of hook-up part 12, while the abutting surface 24 of the drive sleeve 17 is seated on an annular support surface 27 in junction 10.

Tightening of the bolt connection shown in FIG. 1 in conformity with the invention is implemented by rotating the drive sleeve 17 by an already-mentioned hydraulically or pneumatically powered screwdriver of conventional design (not shown), by means of which a tubular rod may be pre-stressed against a junction with considerable force. For a single three-dimensional framework dome of which the largest diameter is about 60 meters, and for tubular rods for instance of outside diameter of 127 mm and a wall thickness of for instance 10 mm, this prestressing may amount to as much as 60 Mp per screw connection, so that such connections can transmit bending moments up to 1.5 Mpmeter, torsional moments up to 0.75 Mpmeter and additionally tension and compression forces of several Mp to a junction. Because the engaged surfaces 21 are located radially outside the periphery of hook-up part 12, the powered screwdriver may be applied in an easy manner from the side and repeatedly to the drive sleeve 17.

In the completed screw connection (FIG. 1), the drive sleeve 17 is solidly clamped between the end face 26 of the hook-up part 12 and the support surface 27 at the junction 10, whereby the lever arms, which are large compared to the tubular rod axis, permit the shunting of extremely large bending moments in the direction of the mutually engaged abutting surface 24 and support surface 27 at the junction. The characteristic of the support surface 27 and the abutting surface 24 being in one plane perpendicular to the tubular rod axis also acts in this sense.

What is claimed is:

1. In a bolt connection between a tubular rod and a junction of a three-dimensional framework having a threaded bore, wherein a threaded bolt insertable into the threaded bore of the junction is rotatably and axially displaceable within a bore in a connecting element secured to the end of the tubular rod, the head of the bolt being disposed on the side of the connecting element away from the junction and within the tubular rod, and wherein a drive sleeve is disposed and secured between an annular support surface around the threaded bore of the junction and the adjacent end face of the connecting element, the drive sleeve being mounted on the shank of the threaded bolt projecting from the connecting element in an axially displaceable manner but secured against rotation relative to the bolt, the improvement wherein:

the connecting element (12) is cylindrical and the outer diameter thereof corresponds substantially to that of the tubular rod (11), the drive sleeve (17) comprises a hub-part (18) surrounding the shank of the bolt and a felly-like annular part (20) around the hub-part (18) and spaced from it, said hub and felly-like parts being connected by spoke-like means (19), and wherein the smallest outer diameter of the annular part (20) is equal to or greater than that of the tubular rod (11) and the connecting element (12).

2. The connection of claim 1, characterized in that the outer surface of the annular part (20) is other than round.

3. The connection of claim 2, characterized in that the outer surface of the part (20) comprises twelve cross-sectionally triangular engagement surfaces (21) adapted to be engaged by a drive tool.

4. The connection of claim 1, characterized in that the two end faces of said hub-part (18) of the drive sleeve (17) are offset inwardly with respect to the felly-like annular part (20) so that the end faces (24, 25) of said felly-like annular part (20) of the drive sleeve (17) are in engagement with the annular support surface (27) of the junction and the end face (26) of the connecting element.

5. The connection of claim 4, characterized in that the support surface (27) of the junction corresponds in size and shape substantially to that of the adjacent end face (24) of said felly-like part.

* * * * *